US012598460B2

(12) United States Patent
Kuravangi-Thammaiah et al.

(10) Patent No.: US 12,598,460 B2
(45) Date of Patent: Apr. 7, 2026

(54) SYSTEM AND METHOD FOR DYNAMIC AUTHORIZATION OF PRIORITY-BASED SESSION

(71) Applicant: Verizon Patent and Licensing Inc., Basking Ridge, NJ (US)

(72) Inventors: Shanthala Kuravangi-Thammaiah, Keller, TX (US); Lalit R. Kotecha, San Ramon, CA (US); Jayshree A. Bharatia, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 313 days.

(21) Appl. No.: 18/398,306

(22) Filed: Dec. 28, 2023

(65) Prior Publication Data

US 2025/0220420 A1     Jul. 3, 2025

(51) Int. Cl.
*H04W 12/06*          (2021.01)
*H04W 8/20*           (2009.01)

(52) U.S. Cl.
CPC ........... *H04W 12/06* (2013.01); *H04W 8/205* (2013.01)

(58) Field of Classification Search
CPC ..... H04W 48/18; H04W 60/04; H04W 76/12; H04W 12/06; H04W 28/0268; H04W 8/205

See application file for complete search history.

(56) References Cited

U.S. PATENT DOCUMENTS

| | | | |
|---|---|---|---|
| 12,075,526 B2* | 8/2024 | Schumacher | ........... H04W 8/08 |
| 2019/0306251 A1* | 10/2019 | Talebi Fard | .......... H04W 76/10 |
| 2022/0295265 A1* | 9/2022 | Jeong | ..................... H04W 8/20 |

| | | | |
|---|---|---|---|
| 2023/0171168 A1* | 6/2023 | Kedalagudde | .......... H04L 41/16 |
| | | | 370/254 |
| 2023/0269188 A1* | 8/2023 | Chen | ....................... H04L 12/14 |
| | | | 370/235 |
| 2023/0269627 A1* | 8/2023 | Tu | .......................... H04W 76/32 |
| | | | 455/422.1 |
| 2023/0337322 A1* | 10/2023 | Talebi Fard | ............ H04W 4/90 |

(Continued)

FOREIGN PATENT DOCUMENTS

| | | | | | |
|---|---|---|---|---|---|
| GB | 2612640 A | * | 5/2023 | ............ | H04W 60/04 |

OTHER PUBLICATIONS

3GPP TS 29.514 version 16.13.0 Release 16 (Year: 2022).*

*Primary Examiner* — Dung Hong

(57)          ABSTRACT

A method, network device, system, and non-transitory computer-readable storage medium are described in relation to priority-based service authorization, including receiving, via an application service, a session request from a user equipment device (UE), wherein the session request includes a priority service subscription indicator associated with invoking a priority service session with the UE; determining, based on an applicable policy, a first authorization of the application service for the priority service; obtaining, from a user data function and based on the first authorization, a subscriber profile associated with the UE; sending, to an authenticator, a request for a second authorization of the UE for the priority service based on a verification of the priority service subscription indicator to the subscriber profile; receiving, from the authenticator, a verification message of the second authorization; and notifying, based on the verification message, the application service of the invoking of the priority service session.

20 Claims, 4 Drawing Sheets

(56)                    References Cited

U.S. PATENT DOCUMENTS

| 2024/0073745 A1* | 2/2024 | Huang | H04W 28/0215 |
| 2024/0244399 A1* | 7/2024 | Sung | H04W 76/40 |
| 2024/0259782 A1* | 8/2024 | Kweon | H04W 88/14 |
| 2025/0030750 A1* | 1/2025 | Lonkar | H04L 65/1104 |
| 2025/0031090 A1* | 1/2025 | Tonesi | H04L 47/2475 |
| 2025/0168072 A1* | 5/2025 | Karampatsis | H04L 41/0894 |
| 2025/0168108 A1* | 5/2025 | Karampatsis | H04L 45/306 |

* cited by examiner

SYSTEM AND METHOD FOR DYNAMIC AUTHORIZATION OF PRIORITY-BASED SESSION

BACKGROUND

Next Generation mobile networks, such as Fifth Generation (5G) wireless networks, are being deployed as the next evolution of wireless networks designed to raise data transfer rates, increase spectral efficiency, improve coverage, expand capacity, and reduce latency. Intelligent network services are becoming more prevalent, especially with the continued expansion of communications services and the proliferation of smart devices and ever-expanding suite of communications and data-based applications and services.

DETAILED DESCRIPTION

Figure 1:
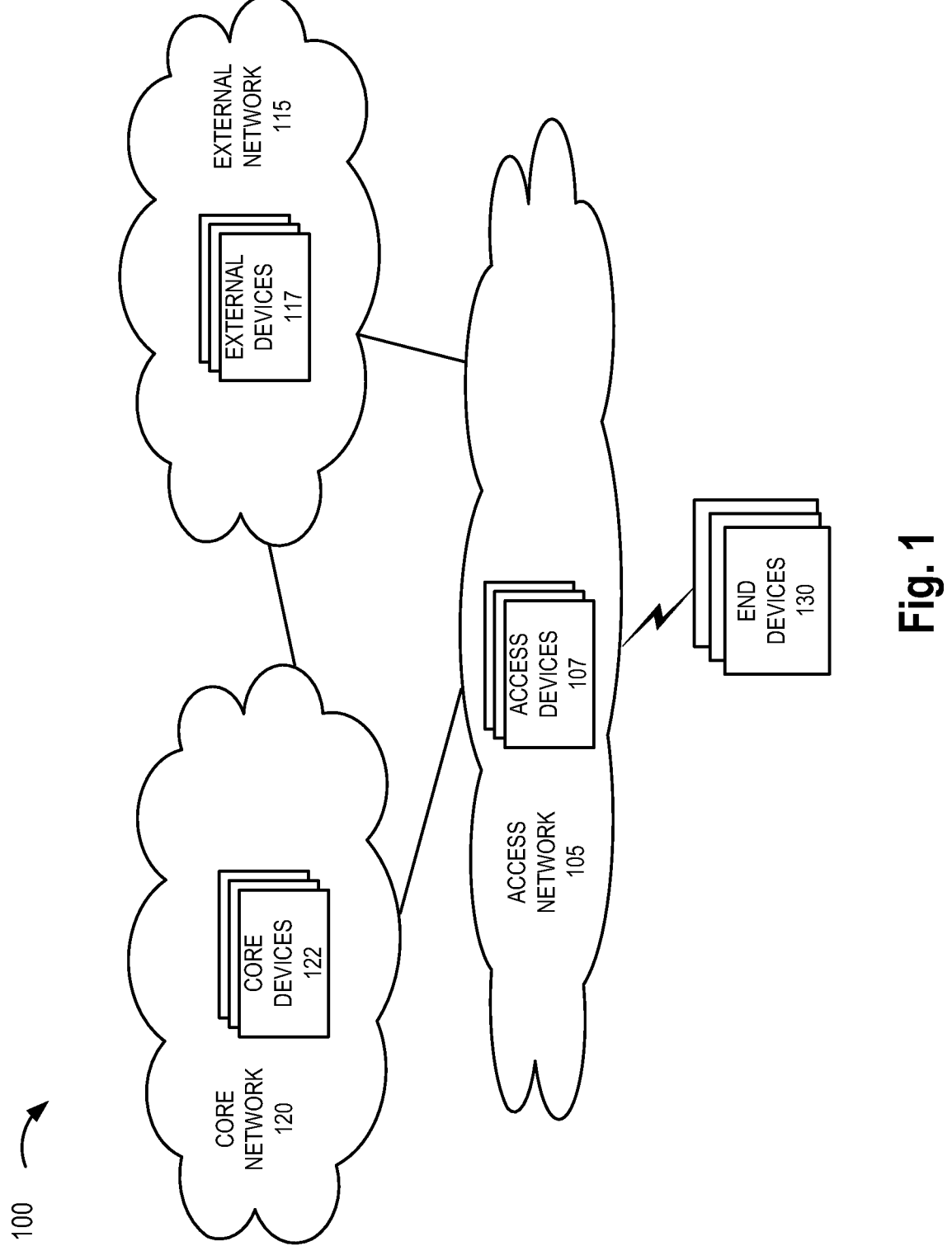
FIG. 1 is a diagram illustrating an exemplary environment in which an exemplary embodiment of a dynamic authorization of priority session service may be implemented.

The following detailed description refers to the accompanying drawings. The same reference numbers in different drawings may identify the same or similar elements. Also, the following detailed description does not limit the invention.

Service providers offer a wide variety of network services, over intelligent networks, such as video services, audio services, quality of service (QOS) services, emergency services, and the like. Emergency services may particularly include personal emergency response services (PERS) or government emergency telecommunications service (GETS), which are accessible, for example, on a priority basis. With many such network services, it is necessary for the service provider network to authenticate a user as being a subscriber or otherwise permitted to access a given service, such as through the entry of a user identifier/identification (ID) and password. Authentication is especially important in high priority service use cases, in which the service bandwidth is prioritized over the traffic for other non-priority (i.e., "normal") services. A limitation in current prioritized access and resource allocation, however, is that the requisite authentication tasks can be resource intensive and time consuming in scenarios that require relatively immediate access to the priority-based service.

The term "priority-based service" or just "priority service" as used herein, is intended to be broadly interpreted to correspond to a level of service in which the delivery of content (e.g., data, video, voice, etc.) over a network supports a greater success rate compared to a lower level of service (e.g., normal service). For example, expedited delivery of content may include end-to-end call completion (e.g., avoid call or delivery failure (e.g., blocking) when the network suffers from high traffic congestion), enhanced routing, priority within the signaling network, prioritized queuing, and/or exemption from network management controls. The priority service may be applicable to wired network(s) and/or wireless network(s).

As will be described herein, a user may be granted a subscription for a priority level assignment. The assignment may provide for one or multiple levels of priority service. For example, a first priority level may correspond to a higher level of priority service than a second priority level. The user may request or invoke priority service on-demand. Additionally, a user associated with a subscription profile without a priority level assignment may alternatively request or invoke priority service, on-demand. Upon authorization, the priority service may be charged to the non-subscription user according to the priority service provisioned.

Embodiments described herein relate to providing users with priority-based service. The priority-based service may be applied to various forms of communication, such as, for example, data (e.g., data transport, Web browsing, file transfer, e-mail, short messaging service (SMS), instant messaging, multimedia messaging service (MMS), or the like), voice (e.g., telephony, voice-over-Internet Protocol (VOIP), point-to-point, conferencing, or the like), and/or video services (e.g., point-to-point, conferencing, or the like). The priority-based service may be requested or invoked on-demand and extended to, for example, mission critical services.

In instances when the user has a subscription to invoke priority-based service, such service may be provisioned based on the user's subscription credentials contained in a subscription profile. In other instances, when the subscription profile does not support a priority level assignment, the user may be offered, for example, a default priority-based service, a selection between different levels of priority-based service, or some other form of priority-based service (e.g., a priority-based service associated with a particular application service) based on, for example, available network resources and current prioritized resource allocation.

According to exemplary embodiments, a dynamic authorization of priority session service is described herein. The dynamic authorization of priority session service may be applied to a wireless environment. For example, such environment may include a Fourth Generation (4G) wireless environment, a wireless local area network (WLAN), a 5G wireless environment, an evolved packet system (EPS)-5G core interworking network, a 4G core network, a 5G core network, and/or a future generation wireless environment, as described herein. According to an exemplary embodiment, the dynamic authorization of priority session service may be invoked by applications or clients associated with the end device while connected to a network, as described herein. According to an exemplary implementation, the dynamic authorization of priority session service may be invoked by an application function (AF) using a network exposure function (NEF).

According to an exemplary embodiment, a NEF, a service capabilities exposure function (SCEF) or another type of network device, may include logic of the dynamic authorization of priority session service, as described herein. According to an exemplary embodiment, the AF may send an initial session request associated with an end device and/or user (referred to simply as "end device") to the NEF or the like, and the request may include a priority service indicator (e.g., a priority service activation indicator, such as a multimedia priority service (MPS) indicator). In some embodiments, the dynamic authorization of priority session service is supported only when the AF receives the priority service indicator in the initial session request. The NEF may use the priority service indicator to request and/or trigger authorization of the priority service session.

According to an exemplary embodiment, the NEF may use authorization information in the priority service indicator to compare to authorization information obtained from one or more network functions (NFs), such as a unified data management (UDM) and/or a unified data repository (UDR) function. According to an exemplary embodiment, the NEF may determine whether the end device is subscribed to the dynamic authorization of priority session service, as described herein. According to an exemplary embodiment, the authorization information may include a general public subscriber identifier (GPSI), a priority service enabled/disabled data structure, such as an information element (e.g., flag), a priority service type information element, a priority service level information element, an authorization address for communicating with another application authorization authenticator, as well as one or more other attributes. According to an exemplary embodiment, the authorization information may be exchanged between the NEF and the one or more other NFs via an interface capable of conveying a data structure configured to contain such priority session service authorization attributes.

According to various exemplary embodiments, the client and/or the AF may use a successful authorization to provision the application service session or elevate an existing application session with the end device, according to the end device priority profile. In one embodiment, the priority profile may include priority service level data and/or priority service type data.

In view of the foregoing, the dynamic authorization of priority session service may improve network security for priority service resource allocation. The dynamic authorization of priority session service may further provide a mechanism to authorize the subscription of the end device in addition to authorization of priority access to application service functionality.

FIG. 1 is a diagram illustrating an exemplary environment 100 in which an exemplary embodiment of a dynamic authorization of priority session service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the dynamic authorization of priority session service may use at least one of these planes of communication. Additionally, an interface of a network function (NF) may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the NF may be provided in order to support the communication (e.g., transmission and reception of messages, information elements (IE), attribute value pairs (AVPs), etc.) between NFs and the dynamic authorization of priority session service logic of the network device, as described herein. According to various exemplary implementations, the interface of the NF may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a 5G RAN, a future generation RAN (e.g., a Sixth Generation (6G) RAN, a Seventh Generation (7G) RAN, or a subsequent generation RAN), a centralized-RAN (C-RAN), an Open-RAN (O-RAN), and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced Long Term Evolution (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access CPE (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, AFs, application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

According to an exemplary embodiment, at least some of external devices 117 may include logic of the dynamic authorization of priority session service. For example, an AF, an AS, a MEC server, an IP server, an Internet or Web server, or a similar network device that may host an application service (also referred to simply as an AF) may provide an exemplary embodiment of the dynamic authorization of priority session service, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a UDM, a UDR, an authentication server function (AUSF), a security anchor function (SEAF), a NEF, a network slice selection function (NSSF), a network repository function (NRF), a policy control function (PCF), a network data analytics function (NWDAF), a SCEF, a lifecycle management (LCM) device, an MME, a packet data gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 may include logic of the dynamic authorization of priority session service. For example, a SCEF, a legacy EF, or another but similar type of network device may provide an exemplary embodiment of the dynamic authorization of priority session service, as described herein. According to an exemplary embodiment, an HSS, an HSS-front end (FE), an HSS database (DB), a legacy subscription storage device (e.g., a home location register (HLR), etc.), or another but similar type of network device may include logic of the dynamic authorization of priority session service. According to an exemplary embodiment, an MME or similar functioning network device may include logic of the dynamic authorization of priority session service.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

Figure 2:
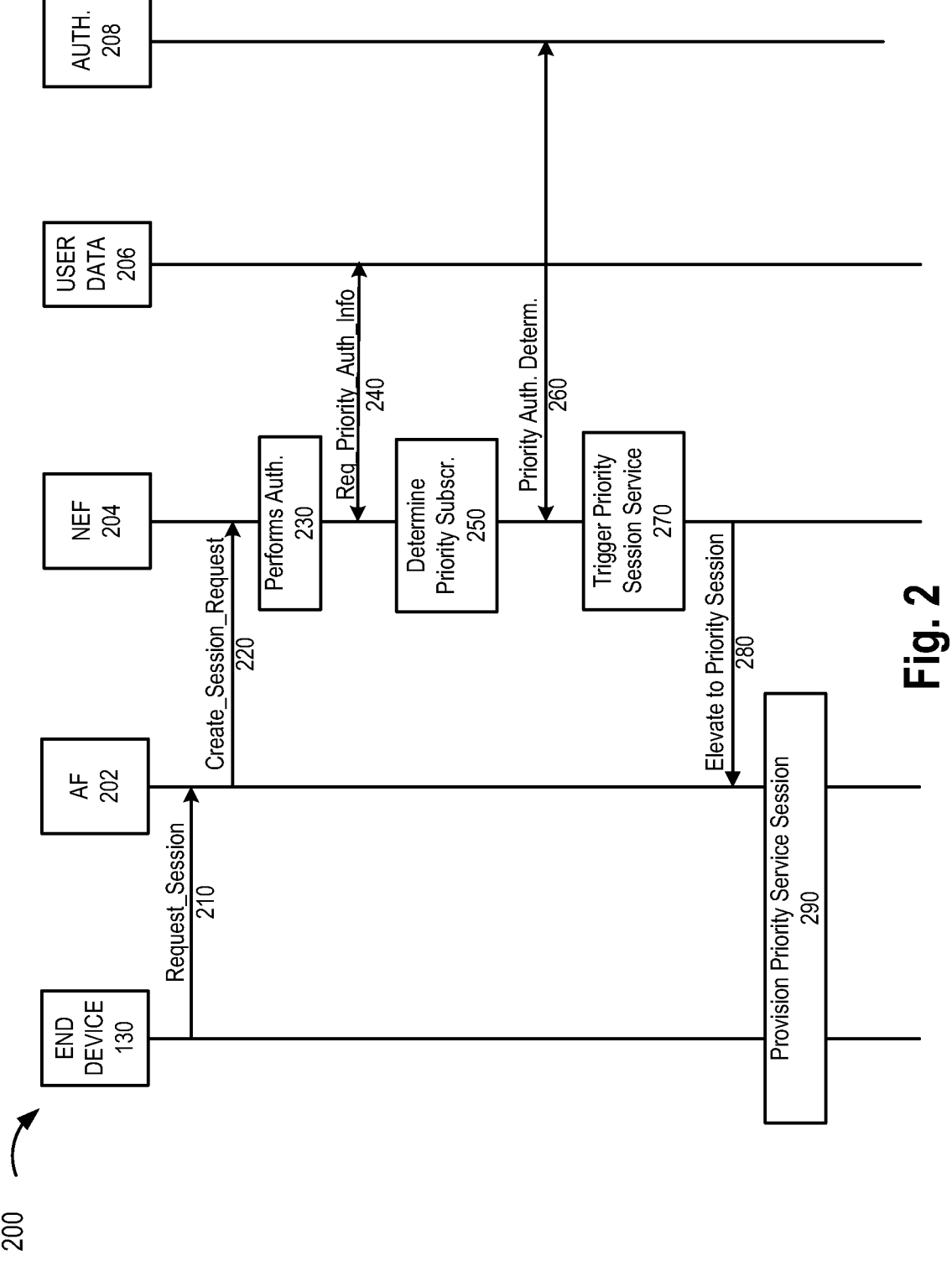
FIG. 2 is a diagram illustrating an exemplary process of an exemplary embodiment of the dynamic authorization of priority session service according to an exemplary scenario.

FIG. 2 is a diagram illustrating an exemplary process 200 of an exemplary embodiment of the dynamic authorization of priority session service. As illustrated, an exemplary environment may include end device 130, an AF 202, a NEF 204, a user data 206 function, and an authenticator 208. AF 202 may be an exemplary implementation of external device 117. NEF 204, user data 206 function, and authenticator 208 may be exemplary implementations of core devices 122. According to another exemplary environment, AF 202 may be implemented as a client hosted by end device 130, and authenticator 208 may be implemented as an external device 117. In one embodiment, user data 206 includes a UDR and/or a UDM functionality.

AF 202 may host an application service that may be used by end device 130. For example, the application service may be an application service described in relation to external device 117. According to various exemplary embodiments, AF 202 may be associated with a network operator or similar entity associated with access network 105, core network 120, and/or external network 115, or may be associated with a third party relative to the network operator or similar entity. NEF 204, user data 206, and authenticator 208 may each provide a function and/or a service in accordance with a network standard, such as 3GPP, 3GPP2, ITU, ETSI, GSMA, or the like and/or of a proprietary nature.

AF 202, NEF 204, user data 206, and authenticator 208 may each include a modified interface or a new interface that supports the communication of a message of the dynamic authorization of priority session service. According to an exemplary embodiment, AF 202, NEF 204, user data 206, and authenticator 208 may each include logic of an exemplary embodiment of the dynamic authorization of priority session service and/or provide support for a process of the dynamic authorization of priority session service, as described herein. For example, AF 202, NEF 204, user data 206, and authenticator 208 may each perform a function, an operation, and/or a service based on the message and/or the dynamic authorization of priority session service beyond a function and/or a service associated with the network standard. For example, AF 202, NEF 204, user data 206, and authenticator 208 may perform a function, an operation, or a service that includes providing dynamic priority service authorization support pertaining to end device 130 and forwarding a priority service indicator (e.g., MPS indicator) or other application signaling message to another network device (e.g., NF) and/or using subscription credentials for authorizing priority session service for a network procedure or operation, as described herein.

Referring to FIG. 2, end device 130 may generate and transmit a session request message 210 to AF 202 (e.g., via access network 105 and core devices 122 (not illustrated). According to various exemplary scenarios, AF 202 may generate and/or transmit session request message 210 before an application service session is established with end device 130, and/or as a part of an initiation of an application service session with end device 130, and not during an active application service session with end device 130. Session request message 210 may include data requesting a priority service level assignment for access, authorization, or allocation of network resources, and an identifier of end device 130 (e.g., an international mobile subscriber identity (IMSI) or another unique identifier for end device 130). According to some exemplary embodiments, session request message 210 may be implemented as a packet data network (PDN) connectivity status message or query. According to some exemplary implementations, session request message 210 may include a unique identifier of AF 202, an application name, or the like that may be used for determining priority service access to AF 202. For example, the unique identifier of AF 202 may be implemented as an identifier other than a network address. According to some exemplary implementations, session request message 210 may include a priority service indicator (e.g., an MPS indicator) requesting a priority session.

In response to receiving and reading session request message 210, AF 204 may forward session request message 210 or generate and transmit a create session request message 220, which may include data requesting a priority service level assignment and an identifier of end device 130, to NEF 204. In response to receiving and reading message 210 or 220, NEF 204 may perform an authorization procedure 230 of AF 202 and/or end device 130 in connection with the priority session request. According to this example, based on the result of authorization procedure 230, NEF 204 may identify or determine whether AF 202 and/or end device 130 is subscribed to and therefore should be allocated network resources in connection with a priority session service.

As part of authorization procedure 230, NEF 204 may generate and transmit a request for priority authorization information 240 to user data 206, which may include UDM and/or UDR functionality. As an example, authorization information may include subscription information of end device 130 may indicate whether end device 130 is subscribed to priority session service, and if so, the priority level assignment. According to some exemplary implementations, the subscription information may include permission information that indicates AF application services for which end device 130 is assigned priority level service. According to some exemplary embodiments, an interface with user data 206 may be configured to include priority service authorization attributes, such as a GPSI, a priority service enabled/disabled data structure such as a flag, a priority service type data structure, a priority service level data structure, an authorization address for communicating with authenticator 208, as well as one or more other attributes. NEF 204 may use all or a portion of the authorization information to determine 250 whether to trigger prioritized access, for end device 130, to an application service of AF 202.

In response to determining priority session service is authorized, NEF 204 may generate and transmit a request for authorization message 260 to authenticator 208, for example, using address information (e.g., a URL) contained in the priority service authorization attributes received from user data 206. According to some exemplary embodiments, authenticator 208 may respond with a message implemented as a positive acknowledgement or a negative acknowledgement. Based on priority authorization determination 260, NEF 204 may or may not trigger the requested priority session service 270. NEF 204 may notify AF 202 of the decision to elevate a priority of the application service session 280. AF 202 may provision end device 130 with a priority service session 290 at an assigned level of priority (e.g., 5, 4, 3, 2, or 1).

FIG. 2 illustrates an exemplary process 200 of the dynamic authorization of priority session service, however, according to other exemplary embodiments, the dynamic authorization of priority session service may perform additional operations, fewer operations, and/or different operations than those illustrated and described in relation to FIG. 2. For example, a client associated with end user 130 may trigger the request for priority session service, instead of AF 202. In another example, authenticator 208 may be a 5GC device.

Figure 3:
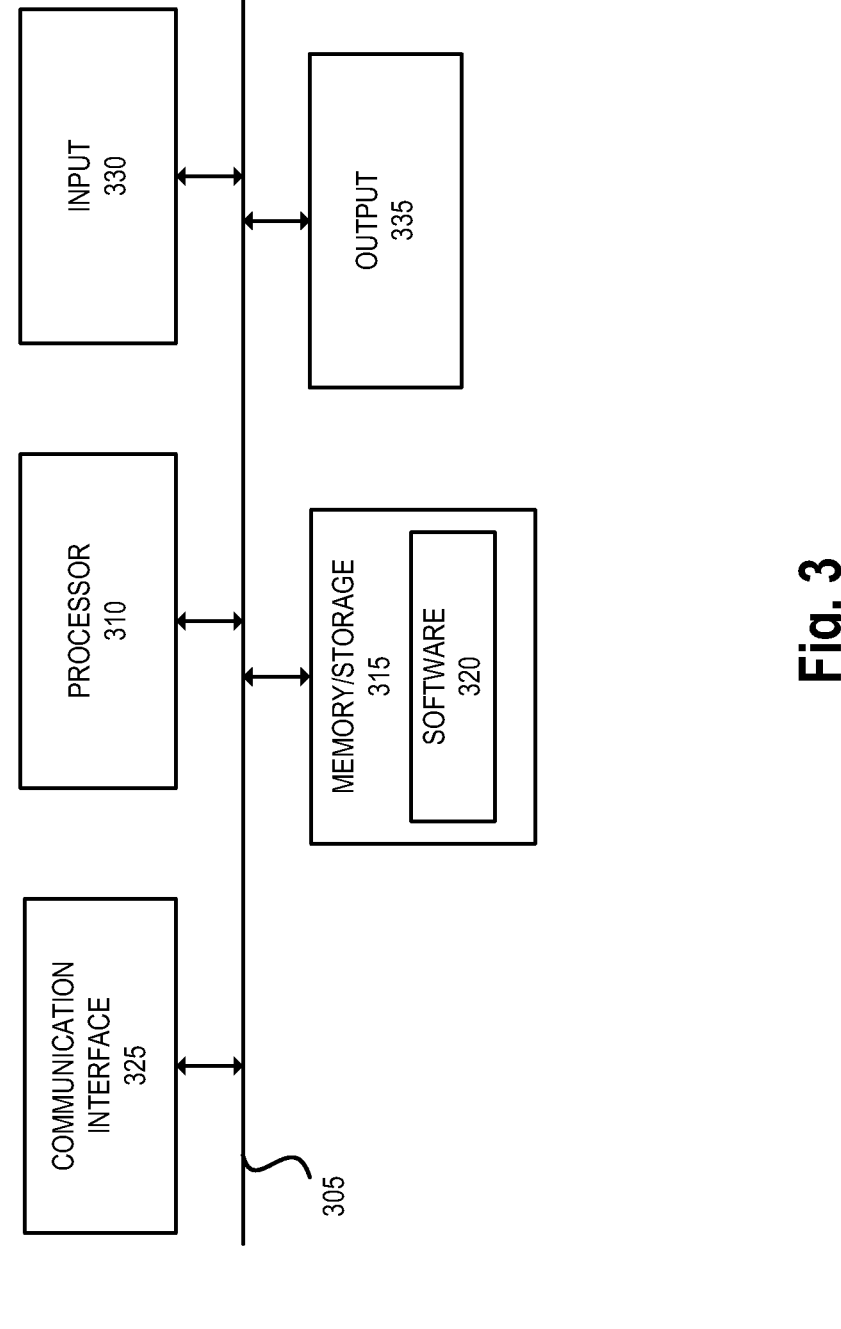
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, etc.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or more operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, multithreading, parallel processing, pipelining, interleaving, learning, model-based, for example.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to core device 122 (e.g., AF 202, SCEF 204, HSS 206, MME 208, SGW 210, etc.), software 320 may include an application that, when executed by processor 310, provides a function and/or a process of the gateway type monitoring event service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard. Communication interface 325 may support one or multiple MIMO, beamforming, and/or transmission/reception configurations.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function, an operation, or a process described herein. Alternatively, for example, according to other implementations, device 300 may be configured to perform a function, an operation, or a process described herein based on the execution of hardware (processor 310, etc.).

Figure 4:
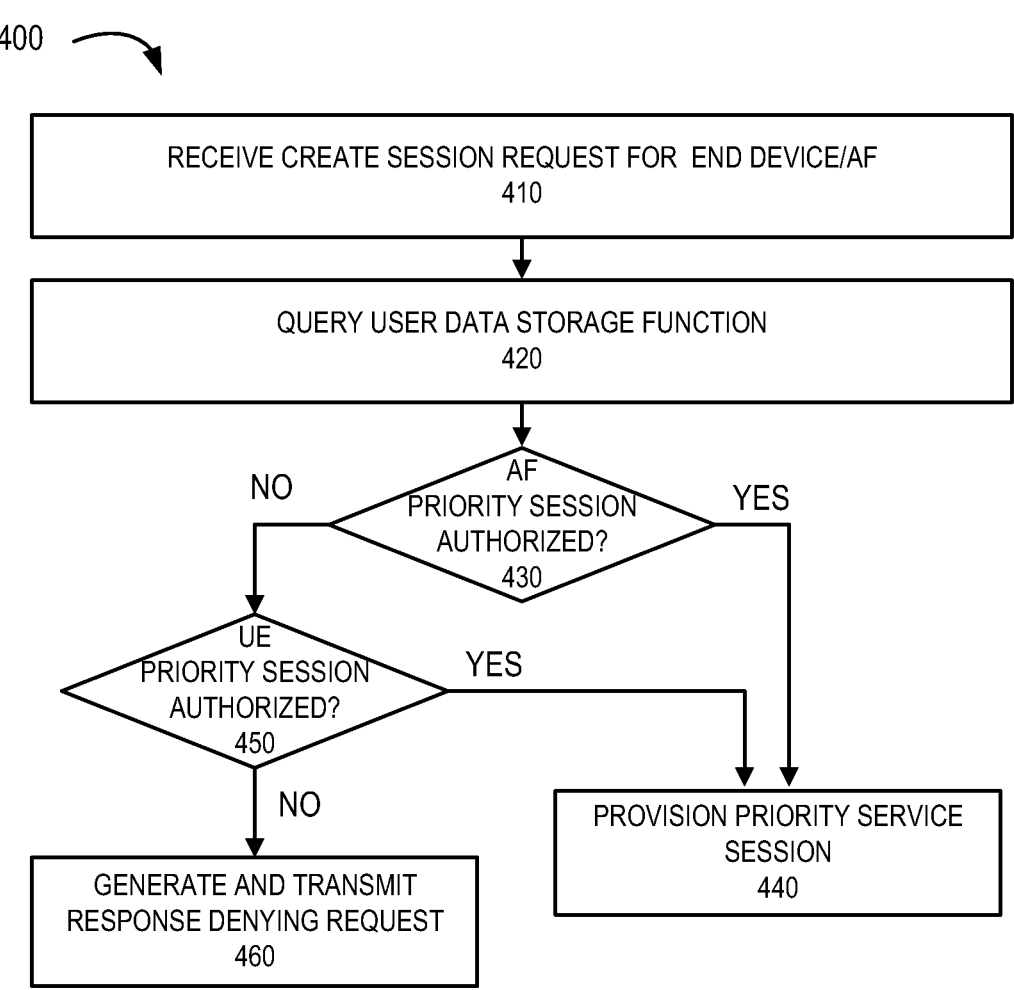
FIG. 4 is a diagram illustrating an exemplary process of an exemplary embodiment of the dynamic authorization of priority session service.

FIG. 4 is a flow diagram illustrating an exemplary process 400 of an exemplary embodiment of the dynamic authorization of priority session service. According to an exemplary embodiment, core devices 122 may perform operations of process 400. For example, a network device or an enforcement function, such as NEF 204 may perform operations or steps of process 400. According to an exemplary implementation, processor 310 executes software 320 to perform a step (in whole or in part) of process 400, as described herein. Alternatively, a step (in whole or in part) may be performed by execution of only hardware. For purposes of description only, operations of process 400 are described as being performed by an EF, such as NEF 204. Process 400 may include an operation illustrated and described in relation to FIG. 2 and elsewhere in the description herein.

Referring to FIG. 4, in block 410, NEF 204 may receive a create session request from end device 130. For example, AF 202 may forward the request to NEF 204. The request may include an end device identifier associated with end device 130. The request may also include a unique identifier of AF 202 for permissions purposes, as described herein. The request may further include priority service activation indicator, such as an MPS indicator.

In block 420, NEF 204 may query a user data storage device. For example, NEF 204 may query user data 206 (e.g., UDR and/or UDM NF) for subscription information of end device 130 in relation to the dynamic authorization of priority session service. The query or request may include the end device identifier and data requesting whether end device 130 is subscribed to the dynamic authorization of priority session service. The query or request may also include the unique identifier of AF 202.

In block 430, NEF 204 may determine whether AF 202 has permission to invoke the dynamic authorization of priority session (block 430). In block 430—YES, when NEF 204 determines that AF 202 is authorized for the dynamic authorization of priority session service, NEF 204 may generate a message to provision a priority service session 440.

In block 430-NO, when NEF 204 determines that AF 202 is not authorized for the dynamic authorization of priority session service, NEF 204 may determine whether end device

130 is subscribed to dynamic authorization of priority session service with respect to AF 202, as well as other AF(s). For example, based on a result of the query or receipt of a response from user data 206, NEF 204 may determine whether end device 130 is assigned a service level priority. In block 450-NO, when NEF 204 determines that end device 130 is not subscribed to dynamic authorization of priority session service, NEF 204 may generate and transmit a response 460 denying the request to AF 202. In block 450—YES, when NEF 204 determines that end device 130 is subscribed to the dynamic authorization of priority session service, NEF 204 may generate a message to provision a priority service session 440.

FIG. 4 illustrates an exemplary process 400 of the dynamic authorization of priority session service, however, according to other exemplary embodiments, the dynamic authorization of priority session service may perform additional operations, fewer operations, and/or different operations than those illustrated and described in relation to FIG. 4. For example, according to other exemplary embodiments, NEF 204 may alternatively perform a similar authorization operation to determine whether end device 130 is subscribed to and/or has permission to invoke the dynamic authorization of priority session in block 450, even when NEF 204 has determined that AF 202 is authorized for priority session service (block 430—YES). According to some embodiments, block 420 may be skipped, for example, when end device 130 has been previously authorized for priority session service in connection with another AF 202.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 4, the order of the blocks may be modified according to other embodiments. Further, non-dependent blocks may be performed in parallel. Additionally, other processes (e.g., FIG. 2) described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A network device comprising:
   a processor configured to:

receive, via an application service, a session request from a user equipment device (UE), wherein the session request includes a priority service subscription indicator associated with invoking a priority service session with the UE;

determine, based on a first policy, a first authorization of the UE for the priority service;

obtain, from a user data function and based on the first authorization, a subscriber profile associated with the UE;

send, to an authenticator, a request for a second authorization of the UE for the priority service based on a verification of the priority service subscription indicator using the subscriber profile;

receive, from the authenticator, a verification message of the second authorization; and notify, based on the verification message, the application service of the invoking of the priority service session with the UE.

2. The network device of claim 1, wherein the subscriber profile comprises a priority profile that includes at least one of an identifier of the UE, a priority service level assignment, a priority service type, or an address of the authenticator.

3. The network device of claim 1, wherein the application service includes an application function establishing bearer services for at least one of voice, video, messaging, or data communications.

4. The network device of claim 1, wherein the application service includes a client hosted by the UE and establishing bearer services for at least one of voice, video, messaging, or data communications.

5. The network device of claim 1, wherein the network device comprises a network exposure function (NEF) and the user data function comprises at least one of a unified data repository function (UDR) or a unified data management (UDM) function.

6. The network device of claim 1, wherein the processor is further configured to:

receive, via another application service, another session request from the UE, wherein the other session request includes another priority service subscription indicator associated with invoking another priority service session with the UE;

determine, based on a second policy, a third authorization of the other application service for the other priority service;

verify, using the subscriber profile associated with the UE and without consulting the user data function, a fourth authorization of the UE; and notify, based on the verification, the other application service of the invoking of the other priority service session with the UE.

7. The network device of claim 1, wherein the network device comprises a service capability exposure function.

8. A method comprising:

receiving, via an application service, a session request from a user equipment device (UE), wherein the session request includes a priority service subscription indicator associated with invoking a priority service session with the UE;

determining, based on a first policy, a first authorization of the UE for the priority service;

obtaining, from a user data function and based on the first authorization, a subscriber profile associated with the UE;

sending, to an authenticator, a request for a second authorization of the UE for the priority service based on a verification of the priority service subscription indicator using the subscriber profile;

receiving, from the authenticator, a verification message of the second authorization; and notifying, based on the verification message, the application service of the invoking of the priority service session with the UE.

9. The method of claim 8, wherein the subscriber profile comprises a priority profile that includes at least one of an identifier of the UE, a priority service level assignment, a priority service type, or an address of the authenticator.

10. The method of claim 8, wherein the application service includes an application function establishing bearer services for at least one of voice, video, messaging, or data communications.

11. The method of claim 8, wherein the application service includes a client hosted by the UE and establishing bearer services for at least one of voice, video, messaging, or data communications.

12. The method of claim 8, wherein the network device comprises a network exposure function (NEF) and the user data function comprises at least one of a unified data repository function (UDR) or a unified data management (UDM) function.

13. The method of claim 8, further comprising:

receiving, via another application service, another session request from the UE, wherein the other session request includes another priority service subscription indicator associated with invoking another priority service session with the UE;

determining, based on a second policy, a third authorization of the other application service for the other priority service;

verifying, using the subscriber profile associated with the UE and without consulting the user data function, a fourth authorization of the UE; and notifying, based on the verification, the other application service of the invoking of the other priority service session with the UE.

14. The method of claim 8, wherein the network device comprises a service capability exposure function.

15. A non-transitory, computer-readable storage media storing instructions, which, when executed by one or more processors of a network device, cause the network device to:

receive, via an application service, a session request from a user equipment device (UE), wherein the session request includes a priority service subscription indicator associated with invoking a priority service session with the UE;

determine, based on a first policy, a first authorization of the UE for the priority service;

obtain, from a user data function and based on the first authorization, a subscriber profile associated with the UE;

send, to an authenticator, a request for a second authorization of the UE for the priority service based on a verification of the priority service subscription indicator using the subscriber profile;

receive, from the authenticator, a verification message of the second authorization; and notify, based on the verification message, the application service of the invoking of the priority service session with the UE.

16. The non-transitory, computer-readable storage media of claim 15, wherein the subscriber profile comprises a priority profile that includes at least one of an identifier of the UE, a priority service level assignment, a priority service type, or an address of the authenticator.

17. The non-transitory, computer-readable storage media of claim 15, wherein the application service includes an application function establishing bearer services for at least one of voice, video, messaging, or data communications.

18. The non-transitory, computer-readable storage media of claim 15, wherein the application service includes a client hosted by the UE and establishing bearer services for at least one of voice, video, messaging, or data communications.

19. The non-transitory, computer-readable storage media of claim 15, wherein the network device comprises a network exposure function (NEF) and the user data function comprises at least one of a unified data repository function (UDR) or a unified data management (UDM) function.

20. The non-transitory, computer-readable storage media of claim 15, wherein the instructions further cause the network device to:

receive, via another application service, another session request from the UE, wherein the other session request includes another priority service subscription indicator associated with invoking another priority service session with the UE;

determine, based on a second policy, a third authorization of the other application service for the other priority service;

verify, using the subscriber profile associated with the UE and without consulting the user data function, a fourth authorization of the UE; and notify, based on the verification, the other application service of the invoking of the other priority service session with the UE.

\* \* \* \* \*